United States Patent [19]

Imai et al.

[11] Patent Number: 4,861,379

[45] Date of Patent: Aug. 29, 1989

[54] SPHERICAL FINE PARTICULATE PIGMENT AND PROCESS FOR PREPARING THE SAME

[75] Inventors: Takeo Imai, Matsudo; Kazuko Iwano, Shakujii, both of Japan

[73] Assignee: Kao Corporation, Tokyo, Japan

[21] Appl. No.: 133,809

[22] Filed: Dec. 16, 1987

[30] Foreign Application Priority Data

Dec. 23, 1986 [JP] Japan .................................. 61-307163

[51] Int. Cl.$^4$ .......................... C09B 63/00; C08K 5/00
[52] U.S. Cl. .................................... 106/402; 106/499; 106/502; 106/504
[58] Field of Search .................... 106/289, 288 Q, 309, 106/402, 499, 502, 504

[56] References Cited

U.S. PATENT DOCUMENTS 4,444,592 4/1984 Ludwig ............................... 106/309
4,523,953 6/1985 Paffoni et al. ....................... 106/289
4,576,649 3/1986 Oliver et al. ......................... 106/309

FOREIGN PATENT DOCUMENTS 0206796 12/1986 European Pat. Off. ........ 106/288 Q

Primary Examiner—Prince E. Willis
Assistant Examiner—Christine A. Skane
Attorney, Agent, or Firm—Oblon, Fisher, Spivak, McClelland & Maier

[57] ABSTRACT

A spherical fine particulate pigment in which pigment particles have a diameter of not more than 0.5 $\mu$, and the surface thereof is treated by a surface active agent, is provided by reacting a water soluble dye and an insolubilizing agent therefor in a water-in-oil type emulsion aqueous phase which is prepared by using a nonionic surface active agent. The pigment has an excellent dispersing ability and outstanding tinting strength. It has a wide variety of uses in the field of cosmetics, paints, inks, or the like.

8 Claims, 1 Drawing Sheet

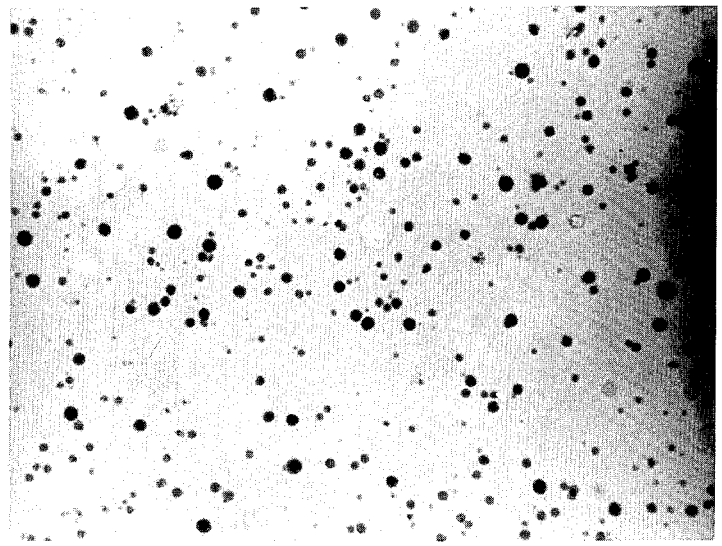

SPHERICAL FINE PARTICULATE PIGMENT AND PROCESS FOR PREPARING THE SAME

BACKGROUND OF THE INVENTION

1. Field of the Invention:

This invention relates to a novel spherical fine particulate pigment which is readily dispersed, possesses a large tinting strength, and provides a distinct color (a color of high saturation). The invention also relates to a process for preparing such a spherical fine particulate pigment.

2. Description of the Background

Conventionally, lake dyes are widely used because of their distinctness of color, availability of variety of colors, and their safety. Such lake dyes comprise a water soluble dye such as, for example, an acidic dye, and an insolubilizing agent thereof such as, for example, aluminum hydroxide carrying on its particle surface said water soluble dye absorbed. But, the aluminum lake, for example, has only a low intensity of color, and suffers a problem of color migration from the lake especially for an aqueous electrolyte solution. In order to improve the safety of dyes, there is proposed a technique for preparing a pigment by reacting a naturally occurring coloring material with a basic aluminum (Japanese Patent Laid-open No. 71128/1978). This method can provide a water insoluble pigment, but the pigment particles are large and irregular in shape. The dyes also has problems with dispersing ability and tinting strength.

The present inventors previously had found a method for improving the dissolution resistance of an aluminum lake by the use of a basic aluminum chloride, and filed a patent application (Japanese Patent Application No. 160323/1986). An aluminum lake had, however, a problem of poor tinting strength, as its dyeing concentration is only 10 to 40%. A trial has been made to render the dye insoluble by the use of a suitable precipitating agent. But, this method does not provide a satisfactory effect depending on the dye's structure. Also, the present inventors prepared a pigment by reacting a basic polyaluminum salt with a dye. But, the pigment obtained had irregularly shaped particles which tended to agglomerate to form a block with a diameter of $1\mu$ to some fifteen microns, and did not provide a desired tinting strength.

It is generally known that the smaller the pigment's particle, the larger the tinting strength of the pigment. For this reason various methods are proposed for producing pigments with fine particles. One example is a method comprising first preparing a pigment with specific comminution assisting agents added thereto, and subsequently pulverizing the pigment particles (Japanese Patent Laid-open Nos. 58061/1984 and 100168/1984). But, the pigments prepared by this method are not uniform in particle shape and size, and thus are not satisfactory in both dispersing ability and tinting strength. Another method is to prepare a powdery pigment dispersant, which comprises dispersing a pigment in a w/o type emulsion resin solution, precipitating the pigment in water, and then drying it (Japanese Patent Laid-open No. 63936/1977). The pigment prepared by this method, however, is comminuted particles of resinous agglomerates which are not uniform in shape and size, and can provide only a poor tinting strength because of its resin-composite structure. Still another method heretofore proposed is to prepare a bead-like pigment suspension by block polymerization of a pigment and a polymeric monomer, and then further effecting suspension polymerization or emulsion polymerization (Japanese Patent Laid-open No. 8033/1977). The method can provide a pigment of spherically shaped particles, but the pigment uses a resin as a carrier and the diameter of the particles ranges from $1.0\mu$ to tens of microns so that it does not provide a satisfactory tinting strength.

In order to improve the tinting strength of a dye, it is desirable to insolubilize the dye active ingredient by means of a suitable precipitating agent. But, a conventional insolubilizing reaction only provide irregularly shaped particles which are often agglomerated. Comminution of the agglomerated pigments also provides irregularly shaped and non-uniform particles with poor dispersing ability and tinting strength.

Pigment particles are often surface-treated to improve their dispersing ability, as the smaller the size of the particles the less dispersed they become. But, particles with poor uniformity can not be easily dispersed in the treating solution, thus making it difficult to surface-treat them.

As mentioned above there has been no pigment whose particles are uniform both in shape and size, and which provides satisfactory dispersing ability and tinting strength.

The present inventors have made extensive and earnest studies in order to solve the above problems in conventional pigments, and as a result found that a pigment comprising fine and spherical particles with diameters of less than $0.5\mu$ can be prepared by reacting a water soluble dye and its insolubilizing agent in a w/o type emulsion water phase, and further, that treatment of the pigment particle surface with a surface active agent can provide a pigment with excellent dispersing ability and tinting strength. Such findings have led to the completion of this invention.

SUMMARY OF THE INVENTION

Accordingly, an object of this invention is to provide, in a pigment which is a reaction product of a water soluble dye and an insolubilizing agent therefor, a spherical fine particulate pigment characterized in that the pigment particles are spherical in shape, have a diameter of not more than $0.5\mu$, and the surface thereof is treated by a surface active agent.

Another object of this invention is to provide a spherical fine particulate pigment, wherein said water soluble dye is an acidic dye and said insolubilizing agent for said water soluble dye is a basic polyaluminum salt or a salt of a divalent metal selected from the group consisting of calcium, barium, and zirconium.

Still other object of this invention is to provide a spherical fine particulate pigment, wherein said water soluble dye is a basic dye and said insolubilizing agent for said water soluble dye is tannic acid or a complex acid selected from the group consisting of phosphomolybdic acid and phosphotungstic acid.

Also, an object of this invention is to provide a spherical fine particulate pigment, wherein pigment particles with a particle diameter within ±25% of an average particle diameter is contained in the amount of not less than 50%.

It is another object of the present invention is to provide a process for preparing a spherical fine particulate pigment which comprises reacting a water soluble dye and an insolubilizing agent therefor in a water-in-oil type emulsion aqueous phase which is prepared by using a nonionic surface active agent.

Other and further objects, features and advantages of this invention will appear more fully from the following description.

BRIEF DESCRIPTION OF THE DRAWING

FIG. 1 is a photograph taken by a transmission electronic microscope (magnification: 7,000) of the pigment particles prepared in Example 1.

DETAILED DESCRIPTION OF THE INVENTION AND PREFERRED EMBODIMENTS

Combinations of a water soluble dye and its insoluble agent are, for instance, an acidic dye and a basic salt of polyaluminum, an acidic dye and a divalent metal salt such as calcium, barium or zirconium, a basic dye and tannic acid, a basic dye and a complex acid such as phosphoniolybdic acid and phosphotungstic acid, and the like. Among these, in view of properties of pigment to be produced, the combinations of an acidic dye and a basic salt of polyaluminum, and a basic dye and a complex acid are particularly preferable.

The compounds represented by the following formula are given as examples of basic polyaluminum salts which are used as an insolubilizing agent:

$Al_m(OH)_nX_l$ in which X represents Cl, Br, I, or $CH_3COO^-$, and m, n and l designate positive integers satisfying the equation $3m=n+l$. Particularly preferred are the compounds represented by the above formula in which m is 14 or less, particularly 1–10, and X is Cl or $CH_3COO^-$. Typical examples of particularly preferred compounds are $Al(OH)_2Cl$, $Al_2(OH)_5Cl$, and the like.

There is no specific restriction as to the kinds of water soluble dyes to be used in this invention. Given as examples of acidic dyes are legal dyestuffs such as FD & C Red No. 2, FD & C Red No. 3, CI Acid Red 18, D & C Red No. 28, CI Acid Red 94, CI Acid Red 52, FD & C Yellow No. 5, FD & C Yellow No. 6, FD & C Green No. 3, FD & C Blue No. 1, FD & C Blue No. 2, D & C Red No. 33, D & C Red No. 22, CI 45410 Acid Red 92, CI Acid Red 94, D & C Orange No. 4, D & C Orange No. 11, D & C Yellow No. 8, D & C Yellow No. 10, D & C Green No. 5, D & C Green No. 8, D & C Green No. 4, D & C Blue No. 4, CI Acid Orange No. 24, CI Acid Violet No. 9, CI 16155 Food Red No. 6, CI Acid Red No. 26, FD & C Red No. 4, EXT D & C Red No. 8, CI Acid Orange No. 20, CI Acid Yellow No. 40, CI Acid Yellow No. 1, EXT D & C Yellow No. 1, CI Acid Yellow No. 11, CI Acid Green No. 3, EXT D & C Violet No. 2, CI Acid Blue No. 1, and the like; and general acidic dyes such as CI Acid Yellow No. 7, CI Acid Yellow No. 70, CI Acid Orange No. 1, CI Acid Orange No. 8, CI Acid Orange No. 45, CI Acid Blue No. 1, CI Acid Blue No. 7, CI Acid Blue No. 15, CI Acid Blue No. 59, CI Acid Blue No. 103, CI Acid Red No. 1, CI Acid Red No. 14, CI Acid Red No. 26, CI Acid Violet No. 15, CI Acid Violet No. 49, CI Acid Green No. 9, CI Acid Green No. 41, CI Acid Black No. 24, and the like. They may be used individually or in combination.

Also, given as examples of basic dyes are legal dyes such as D & C Red No. 19, and the like; and general dyes such as CI Basic Yellow No. 2, CI Basic Orange No. 14, CI Basic Red No. 1, CI Basic Red No. 12, CI Basic Red, CI Basic Violet No. 1, CI Basic Violet No. 3, CI Basic Violet No. 14, CI Basic Blue No. 1, CI Basic Blue No. 5, CI Basic Blue No. 7, CI Basic Blue No. 9, CI Basic Blue No. 26, CI Basic Green No. 1, CI Basic Green No. 4, CI Basic Green, CI Basic Brown No. 1, and the like. They may be used either individually or in combination.

The pigment particles according to this invention have a spherical shape with a diameter of not more than $0.5\mu$, preferably not more than $0.2\mu$, and are surface-treated with a surface active agent. In order to prepare such a pigment, a water soluble dye and its insolubilizing agent are reacted in a w/o type emulsion water phase which is prepared using a nonionic surface active agent.

More specifically, the pigment of the present invention can be prepared by preparing w/o type emulsions using an oil component and a surface active agent for both an aqueous solution of the water soluble dye and an aqueous solution of insolubilizing agent, mixing the two w/o type emulsions to effect reaction, and then eliminating water from the resulting mixture. Alternatively, the pigment can be prepared by first preparing a w/o type emulsion of an aqueous solution of either the water soluble dye or of its insolubilizing agent using an oil component and a surface active agent, adding to the w/o type emulsion the other of an aqueous solution of the water soluble dye or of its insolubilizing agent to effect reaction, and then eliminating the water from the resulting mixture.

A nonionic surface active agent used for preparing the w/o type emulsion may be of the sorbitan fatty acid ester type, glycerol fatty acid ester type, polyoxyethylene alkyl ether type (with not more than 5 mols of ethylene oxide added), lanolin fatty acid ester type, cholesterol ester type, alkyl glyceryl ether type, or the like. The alkyl glyceryl ether type surface active agent is preferable for stability of the system. An oil component used may be a hydrocarbon such as liquid paraffin, paraffin wax, serecin, squalan, and the like; a wax such as bees wax, spermaceti, carnauba wax, and the like; a naturally available animal or vegetable oil or fat such as olive oil, camellia oil, lanolin, and the like; silicone oil, fatty acid, higher alcohol, or an ester oil obtained by reacting them. Particularly preferable oil components are nonpolar oils such as liquid paraffin.

Concentrations of the water soluble dye and the insolubilizing agent in the above reaction may be arbitrarily determined within the range of from 1 to 50% by weight (hereinafter designated simply as "%"). But, it is desirable that their concentrations be from 1 to 10% when their emulsions are prepared. Also, it is desirable that the concentration of the aqueous solution of the water soluble dye or the insolubilizing agent to be added to the emulsion be as close as the saturated concentration of the compound. This saturated concentration depends on the kind of the water soluble dye or the insolubilizing agent used, but a preferable range is usually from 1 to 10%. The proportion of the oil component used when the emulsion is prepared may be arbitrarily determined within the range of from 1 to 99%. But, the preferable range in view of the reaction performance is approximately from 10 to 40%. Also, the proportion of the surface active agent may be arbitrarily determined within the range of from 0.5 to 99%. But, the preferable range for stability of the system and in view of the reaction performance is from 2 to 70%. The reaction temperature is usually from room temperature to approximately 90° C. The desirable temperature at which the water contained in the system after the reaction is eliminated is 120° to 200° C.

The pigment thus prepared is spherical in its particle shape with no irregularity in the particle size, and has a low bulk density. The desired particle diameter of $0.5\mu$ or less may be obtained by controlling the size of drops in the emulsion by means of a colloid mill type homogenizer. The size of the particles can also be regulated by changing the composition of the emulsion. Use of micro-emulsions can produce fine particles. Another feature of the pigment according to the present invention is that the surface of the pigment particles is treated by the nonionic surface active agent used when the emulsion is prepared.

Since the pigment prepared according to the process of this invention comprises particles which are spherical in shape and minute in size, and of which the surface is treated by a surface active agent, it has such an excellent dispersing ability that even the primary particles can be dispersed with ease. In addition, the pigment particles are so minute and homogeneous that they can exert an outstanding tinting strength. Thus, the pigment has a wide variety of uses in the field of cosmetics, paints, inks or the like.

Other features of the invention will become apparent in the course of the following description of the exemplary embodiments which are given for illustration of the invention and are not intended to be limiting thereof.

EXAMPLES

EXAMPLE 1

Monoisostearylglyceryl ether weighing 2.0 gm was added to 20.0 gm of liquid paraffin, and the mixture was heated to 80° C. To this mixture 0.7 gm of a basic polyaluminum salt $[Al_2(OH)_5Cl]$ dissolved in 71.8 gm of water and heated to 80° C. was added slowly while the mixture was stirred to obtain a w/o type emulsion. The size of the emulsion drops was adjusted to about $1.2\mu$ by regulating the clearance through which the emulsion is fed to a colloid mill type homogenizer. 0.5 gm of FD & C Yellow No. 5 dissolved in 5.0 gm of water was added to the emulsion thus prepared, and stirred. Water was eliminated by heating the system to 150° C., and the residue was washed with n-hexane, which was then distilled off to dryness in vacuo to obtain a pigment which is a basic FD & C Yellow No. 5 salt of polyaluminum. Observation of the particle image by means of a transmission electronic microscope revealed that the average particle size is $0.20\mu$, and the the particles are spherical in shape and homogeneous in size. Further it was confirmed that the pigment contained the dye component at a concentration of approximately 40%.

EXAMPLE 2

A pigment was prepared in the same manner as in Example 1, except that the size of emulsion drops was adjusted to $0.6\mu$. The pigment obtained was comprised of spherical and homogeneous particles with an average particle size of $0.07\mu$.

EXAMPLE 3

Monoisostearylglyceryl ether weighing 70 gm was added to 15 gm of liquid paraffin, and the mixture was heated to 80° C. To this mixture 0.7 gm of a basic polyaluminum salt $[Al_2(OH)_5Cl]$ dissolved in 10 gm of water and heated to 80° C. was added slowly while the mixture was stirred to obtain a w/o type emulsion. Added to the emulsion thus prepared was 0.5 gm of FD & C Yellow No. 5 dissolved in 5.0 gm of water, and the mixture was stirred. Water was eliminated by heating the system to 150° C., and the residue was washed with n-hexane, which was then distilled off to dryness in vacuo to obtain a pigment which is a basic FD & C Yellow No. 5 salt of polyaluminum. The pigment obtained was comprised of spherical and homogeneous particles with an average particle size of $0.04\mu$.

EXAMPLE 4

Monoisostearylglyceryl ether weighing 8.0 gm was added to 16 gm of liquid paraffin, and the mixture was heated to 80° C. To this mixture 0.5 gm of a basic polyaluminum salt $[Al_2(OH)_5Cl]$ dissolved in 60 gm of water and heated to 80° C. was added slowly while the mixture was stirred to obtain a w/o type emulsion. Added to the emulsion thus prepared was 0.4 gm of FD & C Red No. 2 dissolved in 15 gm of water, and the mixture was stirred. Water was eliminated by heating the system to 150° C., and the residue was washed with n-hexane, which was then distilled off to dryness in vacuo to obtain a pigment which is a basic FD & C Red No. 2 salt of polyaluminum. The pigment obtained was comprised of spherical and homogeneous particles with an average particle size of $0.10\mu$.

EXAMPLE 5

Monoisostearylglyceryl ether weighing 8.0 gm was added to 16 gm of liquid paraffin, and the mixture was heated to 80° C. To this mixture 0.5 gm of a basic polyaluminum salt $[Al_2(OH)_5Cl]$ dissolved in 60 gm of water and heated to 80° C. was added slowly while the mixture was stirred to obtain a w/o type emulsion. Added to the emulsion thus prepared was 0.4 gm of CI Acid Red No. 18 dissolved in 15 gm of water and the mixture stirred. Water was eliminated by heating the system to 150° C., and the residue was washed with n-hexane, which was then distilled off to dryness in vacuo to obtain a pigment which is a basic CI Acid Red No. 18 salt of polyaluminum. The pigment obtained was comprised of spherical and homogeneous particles with an average particle size of $0.07\mu$.

EXAMPLE 6

Monoisostearylglyceryl ether weighing 8.0 gm was added to 16 gm of liquid paraffin, and the mixture was heated to 80° C. To this mixture 0.5 gm of a basic polyaluminum salt $[Al_2(OH)_5Cl]$ dissolved in 60 gm of water and heated to 80° C. was added slowly while the mixture was stirred to obtain a w/o type emulsion. Added to the emulsion thus prepared was 0.4 gm of D & C Green No. 8 dissolved in 15 gm of water and the mixture was stirred. Water was eliminated by heating the system to 150° C., and the residue was washed with n-hexane, which was then distilled off to dryness in vacuo to obtain a pigment which is a basic D & C Green No. 8 salt of polyaluminum. The pigment obtained was comprised of spherical and homogeneous particles with an average particle size of $0.10\mu$.

EXAMPLE 7

Monoisostearylglyceryl ether weighing 8.0 gm was added to 16 gm of liquid paraffin, and the mixture was heated to 80° C. To this mixture 0.5 gm of a basic polyaluminum salt [Al$_2$(OH)$_5$Cl] dissolved in 60 gm of water and heated to 80° C. was added slowly while the mixture was stirred to obtain a w/o type emulsion. To the emulsion thus prepared was added 0.5 gm of FD & C Blue No. 2 dissolved in 15 gm of water and the mixture was stirred. Water was eliminated by heating the system to 150° C., and the residue was washed with n-hexane, which was then distilled off to dryness in vacuo to obtain a pigment which is a basic FD & C Blue No. 2 salt of polyaluminum. The pigment obtained was comprised of spherical and homogeneous particles with an average particle size of 0.10$\mu$.

EXAMPLE 8

Polyoxyethylene (4) laurylether weighing 8.0 gm was added to 16 gm of liquid paraffin, and the mixture was heated to 80° C. To this mixture 0.5 gm of a basic polyaluminum salt [Al$_2$(OH)$_5$Cl] dissolved in 60 gm of water and heated to 80° C. was added slowly while the mixture was stirred to obtain a w/o type emulsion. To the emulsion thus prepared 0.8 gm of FD & C Blue No. 1 dissolved in 15 gm of water was added and stirred. Water was eliminated by heating the system to 150° C., and the residue was washed with n-hexane, which was then distilled off to dryness in vacuo to obtain a pigment which is a basic FD & C Blue No. 1 salt of polyaluminum. The pigment obtained was comprised of spherical and homogeneous particles with an average particle size of 0.30$\mu$.

EXAMPLE 9

Polyoxyethylene (4) laurylether weighing 8.0 gm was added to 16 gm of liquid paraffin, and the mixture was heated to 80° C. To this mixture 0.6 gm of phosphomolybdic acid dissolved in 60 gm of water and heated to 80° C. was added slowly while the mixture was stirred to obtain a w/o type emulsion. To the emulsion thus prepared 0.5 gm of D & C Red No. 19 dissolved in 15 gm of water was added and stirred. Water was eliminated by heating the system to 150° C., and the residue was washed with n-hexane, which was then distilled off to dryness in vacuo to obtain a lake pigment which is a basic D & C Red No. 19 phosphomolybdate.

EXAMPLE 10

Sorbitan sesquioleate weighing 8.0 gm was added to 16 gm of liquid paraffin, and the mixture was heated to 80° C. To this mixture 0.5 gm of a basic polyaluminum salt [Al$_2$(OH)$_5$Cl] dissolved in 60 gm of water and heated to 80° C. was added slowly while the mixture was stirred to obtain a w/o type emulsion. To the emulsion thus prepared 0.8 gm of FD & C Blue No. 1 dissolved in 15 gm of water was added and stirred. Water was eliminated by heating the system to 150° C., and the residue was washed with n-hexane, which was then distilled off to dryness in vacuo to obtain a lake pigment which is a basic FD & C Blue No. 1 salt of polyaluminum. The pigment obtained was comprised of spherical and homogeneous particles with an average particle size of 0.15$\mu$.

Comparative Example 1

A basic aluminum chloride [Al$_2$(OH)$_5$Cl] weighing 0.7 gm was dissolved in 93.5 gm of water, heated to 80° C., was added 0.5 gm of FD & C Yellow No. 5 dissolved in 5.0 gm of water, and the mixture was stirred. The pigment thus produced was filtered and dried. The pigment which was in an agglomerated state was pulverized by means of a ball mill. The product obtained was comprised of irregularly shaped particles with diameters in the range of 1.0 to 3$\mu$.

Comparative Example 2

Phosphomolybdic acid weighing 0.6 gm was dissolved in 60 gm of water, and heated to 80° C. To this mixture 0.5 gm of FD & C 216 Red No. 3 dissolved in 15 gm of water was added and stirred. The pigment thus produced was filtered and dried. The pigment which was in an agglomerated state was pulverized by means of an automatic mortar. The product obtained was comprised of irregularly shaped particles with diameters in the range of 1.5 to 3$\mu$.

TEST EXAMPLE 1

The dispersing abilities in an oil of pigments prepared in Examples 1 and 2, and Comparative Example 1, as well as that of a commercially available aluminum lake pigment were tested. In this test, 0.5 gm of each pigment was put into 100 ml of a linear paraffinic solvent, dispersed by a ultrasonic dispersing machine for 30 seconds, and left to stand. The dispersion conditions at 5 and 10 minutes after dispersion were observed. The results are shown in Table 1, in which the following standards of the dispersion conditions shall apply:

DDD: No dispersion
CCC: Partly dispersed
BBB: Almost dispersed
AAA: Completely dispersed

TABLE 1

| | Dispersion Conditions | | | |
|---|---|---|---|---|
| | Ex. 1 | Ex. 2 | Compar. Ex. 1 | Commercial Product |
| Immediately after dispersion | AAA | AAA | CCC | CCC |
| 5 min. after dispersion | AAA | AAA | CCC | CCC |
| 10 min. after dispersion | BBB | BBB | DDD | DDD |

TEST EXAMPLE 2

The dispersing abilities in an oil of pigments prepared in Example 9 and Comparative Example 2 were tested. In this test, 1.0 gm of each pigment was put into 100 ml of n-hexane, dispersed by a ultrasonic dispersing machine for 1 minute, and left to stand. The dispersion conditions at 5 minutes after dispersion were observed. The results are shown in Table 2, in which the same standard of the dispersion conditions as in Test Example 1 above shall apply.

TABLE 2

| | Dispersion Conditions | |
|---|---|---|
| | Example 9 | Comparative Example 2 |
| Immediately after dispersion | AAA | CCC |
| 5 min. after dispersion | BBB | DDD |

TEST EXAMPLE 3

The tinting strengths of pigments prepared in Examples 1 and 2, and Comparative Example 1, as well as a commercially available aluminum lake pigment were tested. In this test, 0.5 gm of each pigment and 0.2 gm of titanium oxide were dispersed in 10 ml of hot-melted solid paraffin and cooled down to solidify. The samples were then macroscopically observed for evaluation of tinting conditions. The results are shown in Table 3, in which the following standards of the tinting strength shall apply:

CCC: Normal tinting strength
BBB: High tinting strength
AAA: Exceptionally high tinting strength

TABLE 3

|  | Tinting strength |
|---|---|
| Example 1 | BBB |
| Example 2 | AAA |
| Comparative Example 1 | BBB |
| Commercial Pigment | CCC |

Obviously, numerous modifications and variations of the present invention are possible in light of the above teachings. It is therefore to be understood that the scope of the appended claims, the invention may be practiced otherwise than as specifically described herein.

What is claimed as new and desired to be secured by Letters Patent is:

1. A spherical fine particulate pigment which is a reaction product of a water soluble dye and an insolubilizing agent therefor, wherein said particulate pigment is spherical in shape, has a diameter of not more than 0.5μ, and the surface thereof is treated by a surface active agent, wherein said spherical fine particulate pigment is prepared by the reaction of (i) an acidic water soluble dye and an insolubilizing agent selected from the group consisting of basic polyaluminum salts or salts of a divalent metal selected from calcium, barium, or zirconium or (ii) a basic water soluble dye and an insolubilizing agent which is tannic acid or a complex acid selected from the group consisting of phosphomolybdic acid and phosphotungstic acid, in a water-in-oil emulsion aqueous phase.

2. A spherical fine particulate pigment as claimed in claim 1, wherein pigment particles with a particle diameter within ±25% of an average particle diameter is contained in the amount of not less than 50%.

3. A process for preparing a spherical fine particulate pigment which comprises reacting (i) an acidic water soluble dye and an insolubilizing agent selected from the group consisting of basic polyaluminum salts or salts of a divalent metal selected from calcium, barium, or zirconium or (ii) a basic water soluble dye and an insolubilizing agent which is tannic acid or a complex acid selected from the group consisting of phosphomolybdic acid and phosphotungstic acid, in a water-in-oil emulsion aqueous phase.

4. A process according to claim 3, wherein (i) a water-in-oil emulsion comprising an oil component, a surface active agent, and an aqueous solution of the water soluble dye and (ii) a water-in-oil emulsion comprising an oil component, a surface active agent, and an aqueous solution of insolubilizing agent are separately prepared and then mixed to react.

5. A process according to claim 3, wherein a water-in-oil emulsion of an aqueous solution of either the water soluble dye or of its insolubilizing agent using an oil component and a surface active agent, adding to said water-in-oil emulsion the other of an aqueous solution of the water soluble dye or of its insolubilizing agent.

6. A process according to claim 3, wherein said surface active agent is a nonionic surface active agent.

7. A process according to claim 6, wherein said nonionic surface active agent used for preparing the water-in-oil emulsion is selected from sorbitan fatty acid ester, glycerol fatty acid ester, polyoxyethylene alkyl ether, lanolin fatty acid ester, cholesterol ester, or alkyl glyceryl ether surface active agent.

8. A process according to claim 3, wherein said oil component is selected from liquid paraffin, paraffin wax, serecin, squalan, bees wax, spermaceti, carnauba wax, olive oil, camellia oil, lanolin, silicone oil, fatty acid, higher alcohol, or an ester oil obtained by reacting a fatty acid and a higher alcohol.

* * * * *